Oct. 8, 1929.  F. C. PHILLIPS  1,730,684
FLUID PROJECTING APPARATUS
Filed Aug. 24, 1927
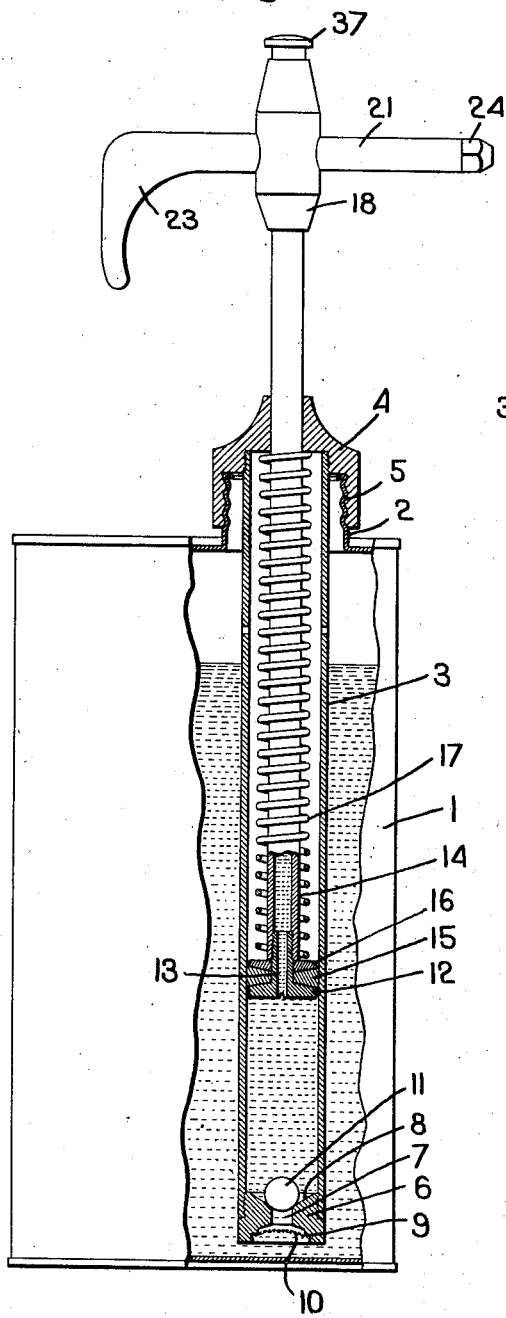
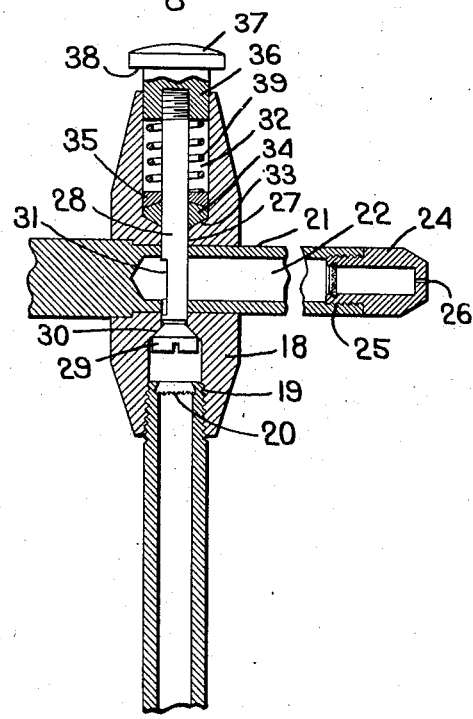
Inventor.
Fred C. Phillips
by Heard Smith & Tennant.
Attys.

Patented Oct. 8, 1929

1,730,684

UNITED STATES PATENT OFFICE

FRED C. PHILLIPS, OF STOUGHTON, MASSACHUSETTS

FLUID-PROJECTING APPARATUS

Application filed August 24, 1927. Serial No. 215,095.

This invention relates to improvements in liquid-projecting apparatus, particularly of the type employed to project oil, from a can or other receptacle, upon the springs of a vehicle. The invention, however, is adapted to various other uses, as will be obvious.

In usual devices of this type, means are provided for producing pressure upon the fluid within the can or receptacle, with a suitable nozzle for discharging the fluid therefrom. In many instances the pressure thus produced is so great as to spring the seals of the can or rupture the same.

One of the objects of the present invention is to provide a liquid-projecting apparatus which can be readily assembled upon the can or other receptacle and employed to discharge the contents thereof without creating pressure upon the liquid in the can, and which will avoid the application of such force to the can or receptacle as will be likely to injure the same. This is accomplished by providing a cylinder with a piston reciprocable therein which is actuated to expel the fluid by resilient means, such as a spring, means being provided for moving the piston to compress the resilient means, so that upon release thereof the resilient means will cause expulsion of the fluid.

A further object of the invention is to provide conveniently operable means when the fluid is under the pressure caused by said resilient means to control the flow of fluid, so that as little or as much as may be desired is projected therefrom.

A further object of the invention is to provide a device of this character in which the discharge conduit for the fluid comprises a hollow piston rod with a nozzle communicating therewith and preferably located transversely thereof to provide a handle for actuating the piston.

The nozzle member may be provided with an extension to form a T-shaped handle.

A further object of the invention is to provide a device of this character with a piston head having a gasket which is acted upon by the spring, so that the spring performs the double purpose of applying pressure to the liquid and expanding the gasket tightly against the cylinder wall.

A further object of the invention consists in providing a novel closure unit for the end of the cylinder comprising a check valve seat having a strainer expanded therein and retained without the use of solder or brazing.

A further object of the invention is to provide a check valve for the inlet port of the cylinder which may be operated, when the liquid therein is not under substantial pressure, by tipping the receptacle to permit the liquid in the cylinder to return to the receptacle.

A further feature of the invention is to provide means for permitting liquid which may leak by the piston to be returned to the receptacle.

Another feature of the invention comprises a novel valve mechanism in the union connecting the tubular piston rod to the nozzle, comprising a spring-actuated valve in which the spring acts normally to retain the valve in closed position and also to expand a gasket surrounding the piston rod, thereby insuring the prevention of leakage.

A further object of the invention is to provide a valve for the conduit which is slidably and rotatably mounted, so that it may be operated to actuate the valve and rotated to grind the valve seat and to clean the valve after the parts have been assembled.

A further feature of the invention resides in the rotatability of the piston and piston rod and the nozzle communicating therewith, so that liquid may be projected in any desired direction while the can or receptacle remains stationary. The capability of such relative movement between the can or receptacle and the nozzle adds greatly to the convenience of the use of the device.

A preferred embodiment of the invention is illustrated in the accompanying drawings, in which:

Figure 1 is a view of the liquid-containing can having a portion of its wall broken away and other portions of the wall thereof illustrated in section, together with a liquid-projecting apparatus shown mainly in section assembled upon said can;

Fig. 2 is an enlarged detail view of the upper end of the tubular piston rod, the nozzle-union and nozzle and the valve for controlling the flow of the liquid from the tubular piston rod to the nozzle.

The present invention is illustrated in the accompanying drawings as applied to a can containing oil or other liquid which it is desired to project in a fine stream upon the springs of an automobile or other object.

The can 1 is of the usual type having an upwardly-extending screw-threaded nipple 2.

The liquid-projecting apparatus comprises a cylinder 3 having a cap 4 screw-threaded thereupon and provided with an internally screw-threaded wall 5 adapted to engage the screw-threads of the nipple 2. The lower end of the cylinder 3 is provided with a novel unit closure comprising a plug 6 of suitable metal having an inlet port 7 therethrough and provided with a connoidally-inclined valve seat 8. The opposite or under side of the plug 6 is countersunk and undercut to provide an annular seat 9 for a fine strainer 10 which is inserted in said countersink and connected to expand, by its resilience, into the undercut recess 9. Thus the screw is retained in place without the necessity for soldering or brazing, which is commonly employed.

The port 7 is provided with a suitable gravity-operable valve which is adapted, when there is no substantial pressure upon the fluid, to be removed from its seat by tilting the can or the cylinder, so that any excess of liquid in the chamber beneath the piston may be returned to the can. The preferred form of valve illustrated herein is a ball 11 which rests upon the conical valve seat 8 and is freely movable in the chamber of the cylinder.

One of the principal features of the invention relates to the means for forcing the liquid from the cylinder by spring pressure. In the construction shown, the cylinder is provided with a piston having a head 12 provided with a central tubular extension 13, the upper end of which is screwed into a tubular piston rod 14 which extends through and is reciprocably mounted in the cap 4. The piston head 12 is provided with an upwardly outwardly-inclined connoidal wall upon which a gasket 15 rests. A collar 16 having a connoidal wall also diverging outwardly, but in the opposite direction to that of the piston rod, engages the opposite face of the gasket 15.

A spring 17 is interposed between the piston and the cap 4, and in the construction shown engages, at its lower end, the collar 16. The spring, therefore, is adapted to perform the double purpose of forcing the piston downwardly toward the inlet check valve and also of exerting sufficient pressure upon the gasket to expand it tightly into engagement with the wall of the cylinder.

Suitable means may be provided for actuating the piston to compress the spring 17, and upon the release thereof permit the spring to exert its pressure upon the liquid, thereby forcing the liquid through the tubular piston rod. Preferred mechanism for accomplishing this purpose comprises a nozzle which is connected to and extends transversely of the piston rod and communicates therewith, and is adapted to provide a handle-member for conveniently operating the piston.

In the construction shown, a nozzle-union 18 is screwed upon the upper end of the piston rod. Desirably, the upper end of the piston rod is provided with an undercut recess 19 in which a strainer 20 is held, by expansion, into the undercut wall and which serves to prevent dirt, grit or other material which may be drawn into the cylinder from interfering with the proper operation of the valve, which will hereinafter be described, which controls the flow of fluid from the tubular piston stem to the nozzle.

The nozzle-union 18 is provided with a transverse aperture in which a nozzle member 21 is fitted. This nozzle member desirably is provided with a hollow chamber or barrel 22 extending from one end thereof a sufficient distance to communicate with the conduit in the nozzle-union, which in turn communicates with the tubular valve stem. The nozzle-member desirably is provided with an extension, which may be curved to form a convenient hand-grip 23 simulating a pistol-grip. The nozzle-member and its extension therefore provide a convenient T-shaped handle by means of which the piston may be withdrawn against the pressure of its spring 17. The nozzle-member 21 is provided with a nozzle tip, the inner end of which is provided with an undercut wall in which a strainer 25 is expanded in the manner hereinbefore described; thus grit and dirt are prevented from clogging the nozzle-outlet 26, which, desirably, is of very small diameter.

The nozzle-union 18 is bored axially in alignment with the axis of the piston rod to provide a guideway 27 for the stem 28 of a valve 29 having a connoidal face which engages a complementary connoidal valve seat 30 formed in the nozzle-union below the nozzle-member 21, and the nozzle-member is bored transversely to permit the valve stem to extend therethrough. Preferably the valve stem is provided with a recessed portion 31 which reduces its diameter, so that when the valve is unseated the liquid can flow more freely through the tubular valve stem into the barrel of the nozzle.

The upper end of the nozzle-union is counter-bored to provide a chamber 32, and the lower end of the counter-sink desirably presents a connoidal wall 33 which converges to the valve stem. A gasket 34 is seated upon the connoidal wall 33 and the upper face of the gasket is engaged by a collar or gland 35 having a reversely-arranged connoidal wall.

The valve stem 28 has screwed or otherwise secured upon it a head 36 which slidably fits the chamber 32 and desirably is provided with an enlargement 37 presenting a shoulder 38 adapted to engage the end of the nozzle-union 18 and limit the movement of the valve. A spring 39, which is interposed between the lower end of the head 36 and the collar 35, serves the double purpose of retaining the valve normally in seated position and also of exerting sufficient pressure upon the collar 35 to expand the gasket, so that it will at all times fit tightly upon the valve stem 28. The valve stem 28 and the head 36 thereof desirably are of cylindrical form and are rotatably mounted in the nozzle-union 18. This construction not only permits the opening of the valve by pressure upon the head of the valve stem, but also permits the valve to be rotated while the spring 39 acts to force the valve firmly against its seat. Therefore, by such rotation of the valve, the valve seat may be ground by the valve after the valve has been assembled, thereby providing a perfect contact between the valve and its seat. If by chance any grit or dirt should be caught between the valve and its seat, the valve may be rotated to displace the same and clean the valve seat by merely rotating the head 36 of the valve stem.

In the use of the device, the usual cap for the nipple 2 of the can is removed, the cylinder of the liquid-projecting apparatus inserted into the can, and the cap 4 thereof screwed upon the nipple 2.

To expel the contents of the can, the nozzle-member with its handle extension 23 is drawn upwardly, thereby raising the piston and compressing the spring 17. At the same time, the vacuum created in the cylinder by the raising of the piston permits the liquid to flow through the inlet port 7 into the chamber of the cylinder beneath the piston.

Upon release of the handle member the spring 17 causes the piston to exert a pressure upon the liquid in the chamber, thereby tending to force the liquid through the tubular piston rod.

By pressing the head 37 of the valve stem 28, the valve is removed from its seat and the liquid, under pressure, flows into the chamber 22 of the nozzle and thence is projected to the outlet 26 in a fine stream. The convenient location of the head 36 of the valve stem 28 enables the valve to be quickly manipulated, so that only so much of the liquid as may be desired will be projected from the nozzle.

It will be observed that no greater pressure will be imposed upon the walls of the can than that provided by the spring 17, so that likelihood of injury to the wall of the can will be avoided.

It will be understood that the embodiment of the invention disclosed herein is of an illustrative character and is not restrictive, and various changes in form and construction of parts may be made within the spirit and scope of the following claims.

Having thus described the invention, what is claimed as new, and desired to be secured by Letters Patent, is:

1. A liquid-projecting apparatus comprising a cylinder having an inlet port provided with a check valve, a piston reciprocable above said port having a tubular piston rod communicating with the chamber of the cylinder between the piston and said check valve, a nozzle communicating with said tubular piston rod, resilient means for actuating said piston to expel the liquid from the cylinder through said piston rod, means operable to move the piston against the pressure of said resilient means, thereby causing the liquid to flow through said inlet port into the cylinder and a valve operable to control the discharge of liquid from said tubular piston rod to said nozzle.

2. A liquid-projecting apparatus comprising a cylinder having an inlet port provided with a check valve, a piston reciprocable above said port having a tubular piston rod communicating with the chamber of the cylinder between the piston and the check valve, a nozzle having a detachable tip provided with a countersunk wall having a strainer expanded therein, resilient means for actuating the piston to expel the liquid from the cylinder through the tubular piston rod, means operable to move the piston against the pressure of the resilient means, thereby causing the liquid to flow through said inlet port into said cylinder and a valve normally spring closed and operable to control the flow of liquid from said tubular piston rod to said nozzle.

3. A liquid-projecting apparatus comprising a cylinder having an inlet port provided with a check valve, a piston reciprocable above said port having a tubular piston rod communicating with the chamber of the cylinder between the piston and the check valve, a nozzle communicating with said tubular piston rod, resilient means for actuating the piston to expel the liquid from the cylinder through said tubular piston rod, a handle on said piston rod reciprocable to move said piston against the pressure of said resilient means, and a spring-actuated valve movable in axial alinement with said piston rod operable to control the discharge of liquid from said tubular piston rod to said nozzle.

4. A liquid-projecting apparatus comprising a cylinder having a cap at one end provided with means for detachably connecting the same to the nipple of a can and an inlet port at the other end, a liquid-delivery conduit extending through said cap and communicating with said cylinder, a piston reciprocable above said inlet port, resilient means acting upon said piston to cause the piston to expel the liquid from the cylinder through said delivery conduit, means for moving said piston to compress said resilient means and to cause fluid to flow through said inlet port into said cylinder, whereby pressure will not be transmitted to the liquid in the can, means for delivering the liquid from the cylinder extending through said cap and a manually operable valve for controlling the delivery of the liquid under pressure of said spring.

5. A liquid-projecting apparatus comprising a cylinder having a cap at one end provided with means for detachably securing the same to the outlet of a receptacle, an inlet port communicating with the other end of said cylinder provided with a check valve, a piston provided with a central port and having a tubular piston rod communicating with said port, a spring interposed between said cap and piston, a nozzle communicating with said tubular piston rod, a valve in said nozzle, a spring normally holding said valve in closed position and a handle operable to move said piston against the pressure of said spring.

6. A liquid-projecting apparatus comprising a cylinder having a cap at one end provided with means for detachably securing the same to the outlet of a receptacle, an inlet port communicating with the other end of said cylinder provided with a check valve, a piston provided with a central port and having a tubular piston rod slidably and rotatably mounted in said cap and communicating with said port, a spring interposed between said cap and piston, a nozzle member forming a handle extending transversely thereof provided with a chamber communicating with said tubular piston rod and forming a handle operable to actuate said piston and adapted to be rotated to permit the liquid to be discharged in any direction and a spring-actuated valve operable to control the flow of fluid from said piston to said nozzle.

7. A liquid-projecting apparatus comprising a cylinder having a cap at one end provided with means for detachably securing the same to the outlet of a receptacle, an inlet port communicating with the other end of said cylinder provided with a check valve, a piston provided with a central port and having a tubular valve stem communicating with said port, a spring interposed between said cap and piston, a nozzle-union secured to said piston rod having a port provided with a valve seat, a nozzle extending transversely of said union communicating with said port, and a spring-controlled valve for said port having a valve stem co-axial with said piston rod.

8. A liquid-projecting apparatus comprising a cylinder having a cap at one end provided with means for detachably securing the same to the outlet of a receptacle, an inlet port communicating with the other end of said cylinder provided with a check valve, a piston provided with a central port and having a tubular valve stem communicating with said port, a spring interposed between said cap and piston, a nozzle-union secured to said piston rod having a port provided with a valve seat, a nozzle extending transversely of said union communicating with said port, a spring-controlled valve for said port having a stem slidably and rotatably mounted in said nozzle-union, and operable by longitudinal movement to open and close said valve and by rotation to grind the valve seat after assembly and to clean said valve seat without removal of the valve.

9. A fluid-projecting apparatus comprising a cylinder having a cap at one end, an inlet at the other end having a check valve, a piston head having a relatively movable collar with a gasket therebetween and provided with a central port, a tubular piston rod communicating with said port, a delivery nozzle communicating with said tubular piston rod, a spring actuated valve for controlling the flow of fluid through said nozzle, and a helical spring interposed between said cap and collar, operable, when compressed, to actuate said piston and to cause the collar to expand said gasket, whereby the passage of fluid into the chamber of the cylinder containing the spring will be substantially prevented.

10. A fluid-projecting apparatus comprising a cylinder having a cap at one end connected with means for detachably securing the same to the outlet of a receptacle, an inlet port communicating with the other end of said cylinder, a piston, a spring interposed between said cap and piston, means for moving said piston against the action of said spring, a delivery conduit extending through said cap communicating with the chamber of said cylinder between the piston and inlet port, a nozzle connecting with said delivery conduit, a spring actuated valve for controlling the discharge of liquid therefrom, a check valve for said inlet port, and a port in the wall of the portion of the cylinder enclosing said spring for permitting liquid leaking by the piston to escape into the receptacle when the piston is raised.

11. A liquid-projecting apparatus comprising a cylinder having a cap at one end, an inlet port at the other end provided with a check valve, a piston having a tubular piston rod, and a port communicating therewith, a nozzle-union connected to said piston rod having a valve seat, a nozzle connected to and extending transversely of said nozzle-union and communicating with said tubular piston rod, a spring-actuated valve co-operating with said valve seat having a stem extending transversely through and slidably fitting an aperture in the barrel of said nozzle, and provided with a recess operable upon the opening of said valve to permit the liquid to flow freely from the chamber of said piston rod through said nozzle.

12. A liquid-projecting apparatus comprising a cylinder having a cap at one end, an inlet port at the other end provided with a check valve, a piston having a tubular piston rod, and a port communicating therewith, a nozzle-union connected to said piston rod having a valve seat, a nozzle connected to and extending transversely of said nozzle-union and communicating with said tubular piston rod, a spring-actuated valve co-operating with said valve seat having a stem extending transversely through the barrel of said nozzle and provided with a head, a gland in said union surrounding said valve stem and having a connoidal wall, a relatively movable collar having a reversely-inclined wall, a gland between said connoidally-converging walls, and a spring interposed between said collar and said valve-stem head operable to close said valve and to expand said packing.

13. A liquid-projecting apparatus comprising a cylinder having a cap at one end, and a closure unit detachably connected to the other end provided with an inlet port having a countersunk recess with an under-cut wall, a strainer of greater area than said port expanded in said under-cut wall at a distance from said port, and a valve for said port, a piston reciprocable in said cylinder and means for discharging fluid from said cylinder under pressure caused by the reciprocation of said piston.

In testimony whereof, I have signed my name to this specification.

FRED C. PHILLIPS.